United States Patent
Karatas et al.

(10) Patent No.: US 10,584,927 B2
(45) Date of Patent: Mar. 10, 2020

(54) TUBE THERMAL COUPLING ASSEMBLY

(71) Applicant: General Electric Company, Schenectady, NY (US)

(72) Inventors: Caner Karatas, Umraniye/Istanbul (TR); Hasan Yoruk, Umraniye/Istanbul (TR)

(73) Assignee: General Electric Company, Schenectady, NY (US)

( * ) Notice: Subject to any disclaimer, the term of this patent is extended or adjusted under 35 U.S.C. 154(b) by 492 days.

(21) Appl. No.: 14/984,349

(22) Filed: Dec. 30, 2015

(65) Prior Publication Data
US 2017/0191766 A1 Jul. 6, 2017

(51) Int. Cl.
*F28F 21/08* (2006.01)
*F02C 7/14* (2006.01)
(Continued)

(52) U.S. Cl.
CPC .............. *F28F 21/081* (2013.01); *F02C 7/14* (2013.01); *F02C 7/224* (2013.01); *F23R 3/28* (2013.01);
(Continued)

(58) Field of Classification Search
CPC .. F02C 7/224; F02C 7/222; F02C 7/22; F02C 7/24; F05D 2260/208; F05D 2260/207;
(Continued)

(56) References Cited

U.S. PATENT DOCUMENTS 2,781,636 A * 2/1957 Brandes ................ F01D 25/005
106/426
3,864,909 A 2/1975 Kern
(Continued)

FOREIGN PATENT DOCUMENTS

EP 1 746 257 A2 1/2007
EP 1 884 625 A2 2/2008
(Continued)

OTHER PUBLICATIONS

"An unlikely competitor for diamond as the best thermal conductor" (Jul. 8, 2013) retrieved Mar. 18, 2018 from https://phys.org/news/2013-07-competitor-diamond-thermal-conductor.html.*
(Continued)

*Primary Examiner* — Gerald L Sung
*Assistant Examiner* — Alain Chau
(74) *Attorney, Agent, or Firm* — General Electric; James Reed

(57) ABSTRACT

A thermal coupling assembly for facilitating thermal transfer between a heat source and a heat sink is provided herein. The thermal coupling assembly includes a thermally conductive element, an insulative wrap, and a cover. The thermally conductive element includes a first end wall configured to engage a surface of the heat source, a second end wall configured to engage a surface of the heat sink, and a body including a thermal conductor. The insulative wrap at least partially surrounds the thermally conductive element, the heat source, and the heat sink. The cover at least partially surrounds at least one of said insulative wrap, the thermally conductive element, the heat source, and the heat sink.

16 Claims, 4 Drawing Sheets

(51) Int. Cl.
*F02C 7/224* (2006.01)
*F28B 7/00* (2006.01)
*F28D 15/02* (2006.01)
*F23R 3/28* (2006.01)
*F28F 13/00* (2006.01)
*F28D 7/00* (2006.01)

(52) U.S. Cl.
CPC ....... *F28D 7/0008* (2013.01); *F28D 15/0275* (2013.01); *F05D 2250/712* (2013.01); *F05D 2260/207* (2013.01); *F05D 2260/208* (2013.01); *F05D 2260/213* (2013.01); *F28F 2013/006* (2013.01); *F28F 2270/00* (2013.01)

(58) Field of Classification Search
CPC ........... F05D 2260/213; F05D 2300/10; F05D 2300/612; F05D 2250/712; F28D 15/02; F28D 15/0275; F28D 7/00; F28D 7/0008; F28F 21/081–087; F28F 2270/00; F28F 2013/006; Y02T 50/671; Y02T 50/675
See application file for complete search history.

(56) References Cited

U.S. PATENT DOCUMENTS

| | | | |
|---|---|---|---|
| 4,151,710 A * | 5/1979 | Griffin | F02C 7/14 184/6.11 |
| 4,161,647 A | 7/1979 | Carbonnel | |
| 5,269,468 A * | 12/1993 | Adiutori | F23R 3/283 239/132 |
| 5,307,639 A | 5/1994 | Boissin | |
| 6,003,781 A | 12/1999 | Kwan | |
| 6,898,926 B2 | 5/2005 | Mancini | |
| 6,905,566 B1 * | 6/2005 | Pitzer | B29C 53/385 156/201 |
| 7,481,059 B2 | 1/2009 | Andersson et al. | |
| 7,530,231 B2 | 5/2009 | Prociw et al. | |
| 7,559,142 B2 | 7/2009 | Patel et al. | |
| 7,823,374 B2 * | 11/2010 | Venkataramani | F02C 7/047 60/226.1 |
| 7,900,438 B2 * | 3/2011 | Venkataramani | F01D 9/065 244/134 B |
| 8,234,873 B2 | 8/2012 | Houtman et al. | |
| 8,276,387 B2 | 10/2012 | Prociw et al. | |
| 8,430,365 B2 | 4/2013 | Benoit et al. | |
| 8,443,608 B2 * | 5/2013 | Williams | F02C 7/222 60/740 |
| 8,468,849 B2 | 6/2013 | Kesler et al. | |
| 8,469,082 B2 * | 6/2013 | Perry | F16L 53/00 165/185 |
| 2005/0252193 A1 | 11/2005 | Iya et al. | |
| 2006/0032231 A1 * | 2/2006 | Andersson | F02C 7/222 60/765 |
| 2006/0218926 A1 * | 10/2006 | Prociw | F02C 7/14 60/739 |
| 2007/0018038 A1 * | 1/2007 | Jarmon | F01D 15/10 244/59 |
| 2007/0107444 A1 | 5/2007 | Cutting et al. | |
| 2008/0053100 A1 | 3/2008 | Venkataramani et al. | |
| 2008/0196781 A1 * | 8/2008 | Grescher | F01N 13/008 138/106 |
| 2009/0211256 A1 * | 8/2009 | Williams | F02C 7/222 60/739 |
| 2010/0026302 A1 | 2/2010 | Doty et al. | |
| 2010/0155016 A1 * | 6/2010 | Wood | F01D 25/12 165/51 |
| 2010/0236215 A1 * | 9/2010 | Venkataramani | F01D 9/065 60/39.093 |
| 2011/0100020 A1 * | 5/2011 | Zhang | F01D 5/185 60/806 |
| 2011/0232293 A1 | 9/2011 | Leese | |
| 2012/0199335 A1 | 8/2012 | Maurer | |
| 2013/0247574 A1 * | 9/2013 | Patel | F02C 7/222 60/734 |
| 2013/0305730 A1 * | 11/2013 | Donnelly | F02C 7/22 60/772 |
| 2014/0090395 A1 | 4/2014 | Appukuttan et al. | |
| 2015/0000874 A1 * | 1/2015 | Veilleux, Jr. | F28D 15/04 165/104.26 |
| 2015/0090434 A1 * | 4/2015 | Lemak | H01L 23/3733 165/185 |
| 2015/0285088 A1 | 10/2015 | Ballard, Jr. et al. | |
| 2017/0009659 A1 * | 1/2017 | Chalaud | F02C 7/222 |

FOREIGN PATENT DOCUMENTS

| | | | |
|---|---|---|---|
| FR | 3017416 A1 * | 8/2015 | ............. F02C 7/222 |
| JP | S58-088082 U | 6/1983 | |
| JP | H06-317391 A | 11/1994 | |
| JP | H09-197048 A | 7/1997 | |
| JP | 3462595 B2 | 11/2003 | |
| JP | 2004-085183 A | 3/2004 | |
| JP | 2004085183 A * | 3/2004 | |
| JP | 2004-251596 A | 9/2004 | |
| JP | 2008-057965 A | 3/2008 | |
| JP | 2008-091916 A | 4/2008 | |
| JP | 2009-298206 A | 12/2009 | |
| JP | 2013-224660 A | 10/2013 | |
| JP | 2015-200307 A | 11/2015 | |
| WO | 2004/051168 A2 | 6/2004 | |
| WO | 2014/086858 A2 | 6/2014 | |
| WO | WO 2015006485 A1 * | 1/2015 | ............... C25D 7/00 |

OTHER PUBLICATIONS

Lin, Wamei & Yuan, Jinliang & Sunden, Bengt. (2011). Review on Graphite Foam as Thermal Material for Heat Exchangers. Energy End-Use Efficiency Issues (EEE). 10.3384/ecp11057748.*

"POCOFoam", POCOGraphite (2008) retrieved Mar. 18, 2018 from http://www.poco.com/Portals/0/Literature/Semiconductor/78962v2PocoFoamFlyer.pdf.*

Engineering ToolBox, (2005). Thermal Conductivity of Metals. [online] Available at: https://www.engineeringtoolbox.com/thermal-conductivity-metals-d_858.html [Accessed Mar. 18, 2018].*

Extended European Search Report and Opinion issued in connection with corresponding EP Application No. 16203693.3 dated May 16, 2017.

Machine Translation and Notification of Reasons for Refusal issued in connection with corresponding JP Application No. 2016-246077 dated Feb. 13, 2018.

Machine Translation and First Office Action and Search issued in connection with corresponding CN Application No. 201611256445.1 dated Nov. 1, 2018.

* cited by examiner

TUBE THERMAL COUPLING ASSEMBLY

BACKGROUND

The field of the disclosure relates generally to gas turbine engines and, more particularly, to a method and system for thermally coupling flow assemblies.

As gas turbine engines become more efficient and powerful, controlling temperatures of various components of the engine becomes more critical yet more difficult. In engine systems, a fuel manifold is a critical component, as it is responsible for the delivery of fuel to a core engine for combustion. However, in at least some known engine systems, the fuel manifold is positioned adjacent the core engine, and as such as exposed to heat transfer from the core engine through radiation and convection. Such heat transfer causes fuel conduits in the fuel manifold, as well as the fuel itself, to increase in temperature, which results in fuel coke accumulation in the fuel manifold and/or in a fuel nozzle. This accumulation in turn leads to reduced engine combustion efficiency and increased fluid-coupled dynamics issues, as well as shorter engine service intervals.

BRIEF DESCRIPTION

In one aspect, a thermal coupling assembly is provided. The thermal coupling assembly includes a thermally conductive element, an insulative wrap, and a cover. The thermally conductive element includes a first end wall configured to engage a surface of a heat source, a second end wall configured to engage a surface of a heat sink, and a body including a thermal conductor. The insulative wrap at least partially surrounds the thermally conductive element, the heat source, and the heat sink. The cover at least partially surrounds at least one of said insulative wrap, the thermally conductive element, the heat source, and the heat sink.

In another aspect, a method of thermally coupling a heat source and a heat sink is provided. The method includes coupling a thermally conductive element to the heat source and the heat sink. The thermally conductive element includes a first end wall configured to engage a surface of the heat source, a second end wall configured to engage a surface of the heat sink, and a body including a thermal conductor. The method also includes wrapping an insulative member around the thermally conductive element, the heat source, and the heat sink, and encasing the insulative member, the thermally conductive element, the heat source, and the heat sink in a cover.

In yet another aspect, a turbofan engine is provided, the turbofan engine including a core engine, a fuel management system configured to provide fuel to said core engine, and a thermal coupling assembly coupled to said fuel management system. The thermal coupling assembly includes a thermally conductive element, an insulative wrap, and a cover. The thermally conductive element includes a first end wall configured to engage a surface of a heat source of the fuel management system, a second end wall configured to engage a surface of a heat sink of the fuel management system, and a body including a thermal conductor. The insulative wrap at least partially surrounds the thermally conductive element, the heat source, and the heat sink. The cover at least partially surrounds at least one of said insulative wrap, the thermally conductive element, the heat source, and the heat sink.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Embodiments of the thermal coupling assemblies described herein provide an efficient method for facilitating thermal transfer between a heat source and a heat sink. More particularly, in one embodiment described herein, the thermal coupling assembly provides heat transfer between fuel conduits to reduce a temperature difference between the conduits and the fuel channeled therethrough. Reducing this temperature difference reduces fuel coke build-up in the fuel conduits, which improves engine performance, and extends service intervals for the fuel conduits and fuel nozzles. The thermal coupling assembly includes a thermally conductive element configured to transfer heat between the conduits, an insulative wrap configured to reduce thermal transfer from the thermal environment around the conduits, and a cover configured to hold the thermal coupling assembly together and reduce radiative thermal transfer from the thermal environment around the conduits.

Figure 1:
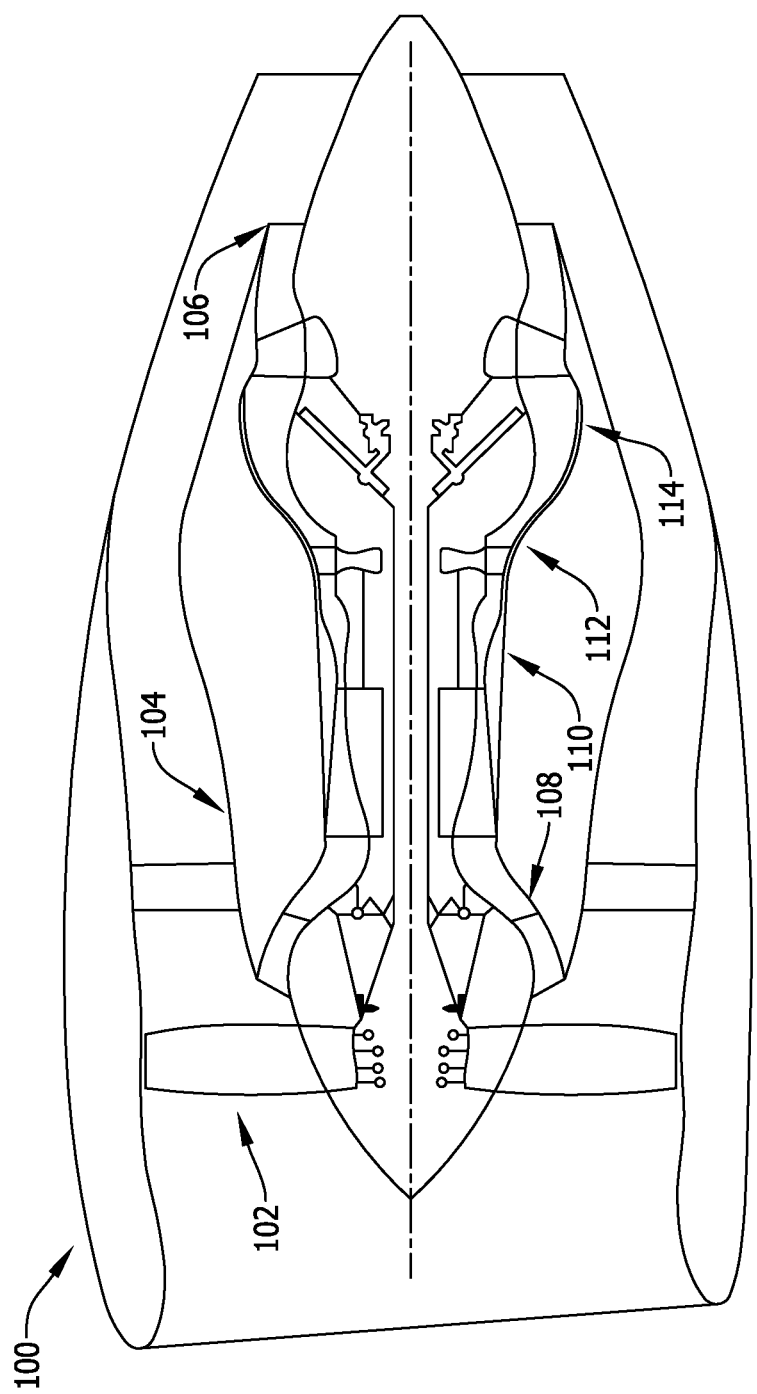
FIG. 1 is a schematic illustration of an exemplary gas turbine engine in accordance with an example embodiment of the present disclosure.

FIG. 1 is a schematic illustration of an exemplary gas turbine engine 100. Gas turbine engine 100 includes a fan system 102, a core system 104, and an exhaust system 106 arranged in axial flow communication with one another. Core system 104 includes a compressor assembly 108, a combustion assembly 110, a high pressure turbine assembly 112, and a low pressure turbine assembly 114. During operation, air is directed into compressor assembly 108, and the air is compressed and is then directed into combustion assembly 110. Within combustion assembly 110, the compressed air is mixed with fuel and ignited to generate combustion gas, and the combustion gas is subsequently directed through high pressure turbine assembly 112 and low pressure turbine assembly 114 for discharge into the ambient air via exhaust system 106. In other embodiments, gas turbine engine 100 may include any suitable fan system, core system, and/or exhaust system configured in any suitable manner.

Figure 2:
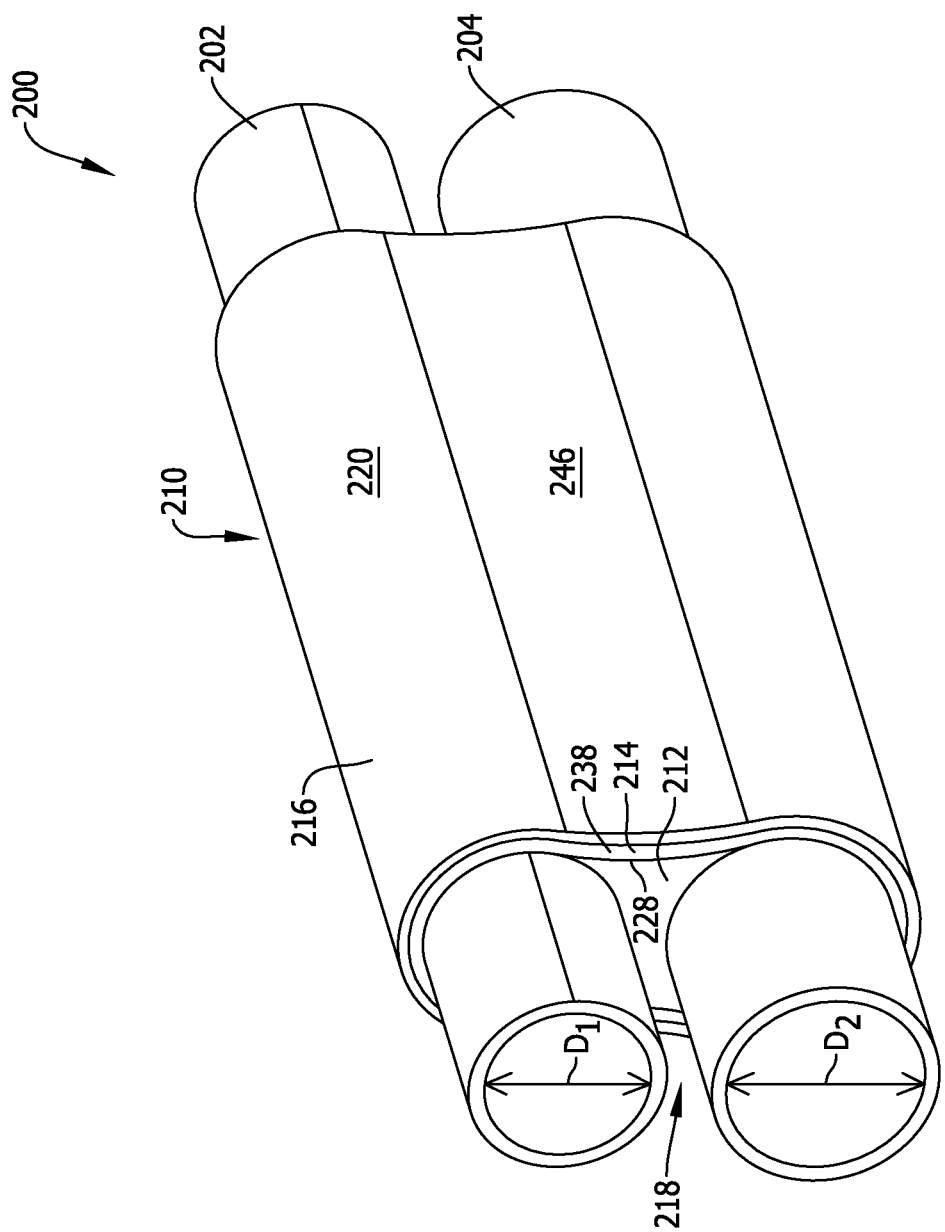
FIG. 2 is a perspective view of a fuel management system of the gas turbine engine shown in FIG. 1 including a thermal coupling assembly.
Figure 3:
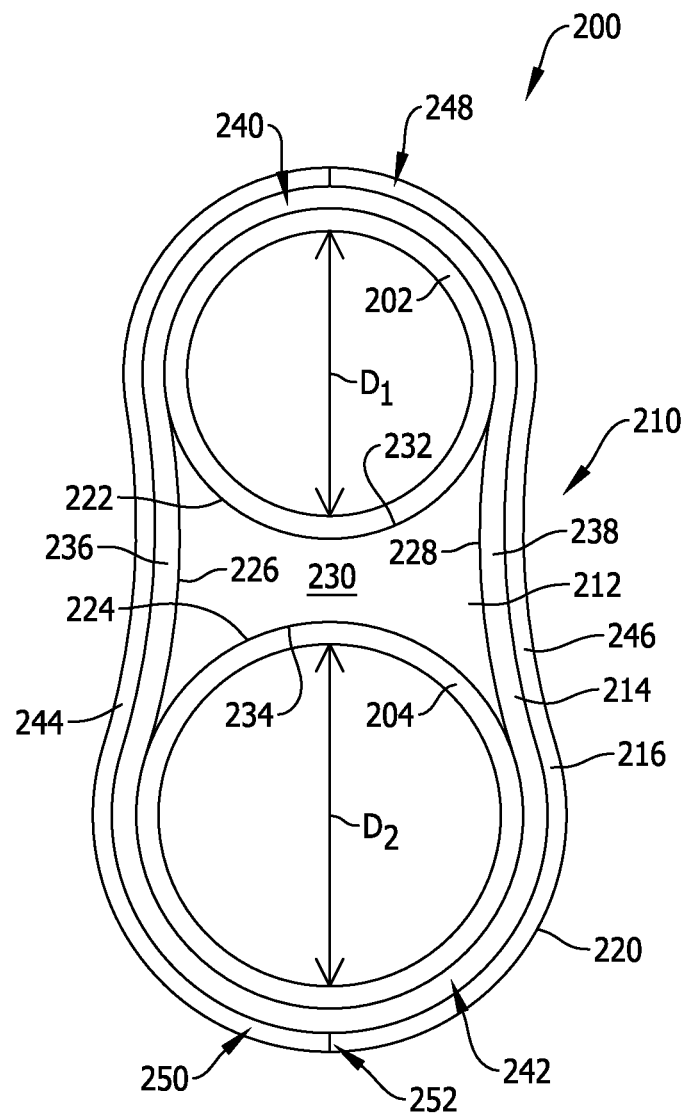
FIG. 3 is a first cross-sectional view of the fuel management system including the thermal coupling assembly shown in FIG. 2.
Figure 4:
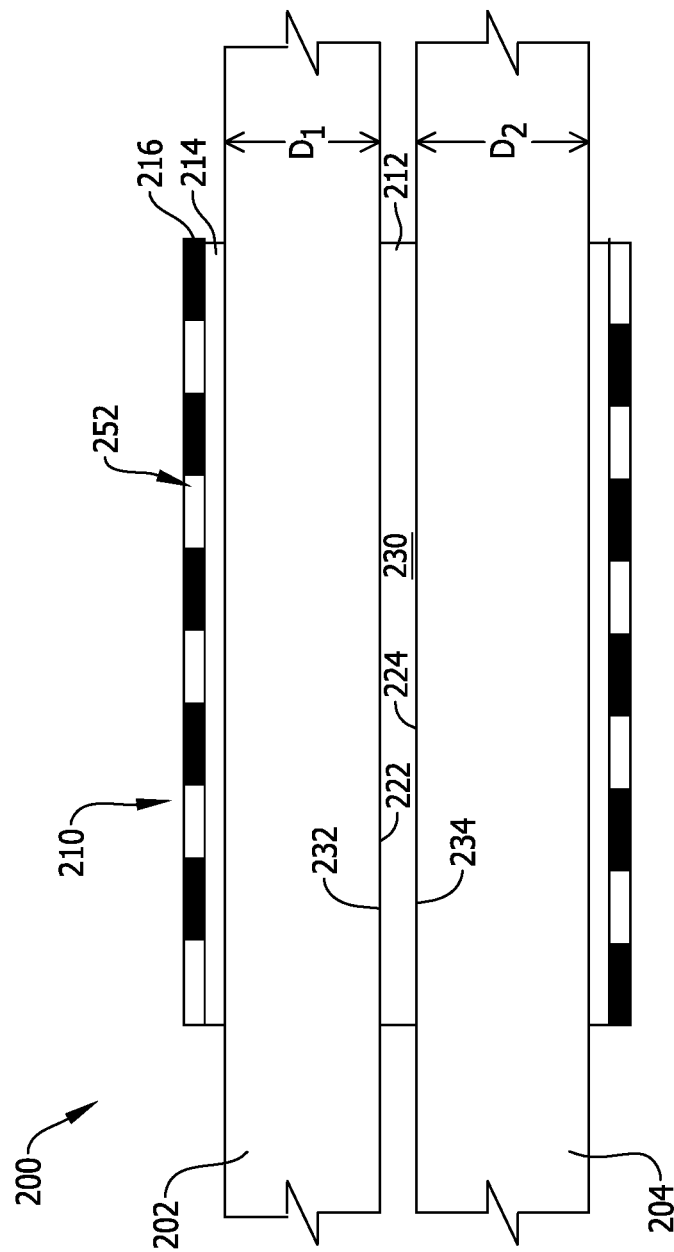
FIG. 4 is a second cross-sectional view of the fuel management system including the thermal coupling assembly shown in FIGS. 2 and 3.

FIGS. 2-4 illustrate a perspective view and two cross-sectional views, respectively, of a fuel management system 200 of combustion assembly 110. In particular, fuel management system 200 includes first and second fuel conduits 202, 204, extending parallel to each other, which are configured to channel fuel to a core engine (not specifically shown). It should be understood that although two fuel conduits are shown, the present disclosure is applicable to fuel management systems including any number of fuel conduits (e.g., three fuel conduits). Moreover, although the example embodiment is directed to fuel systems, it should be understood that the present disclosure is readily applicable to alternative systems, such as oil systems. First fuel conduit 202 has a first diameter $D_1$, and second fuel conduit 204 has a second diameter $D_2$. In the illustrated embodiment, diameter $D_2$ is greater than diameter $D_1$, such that more fuel may be channeled through second fuel conduit 204 in a given amount of time. Based on these differences in diameter and fuel flow rate, a temperature difference exists between first fuel conduit 202 and second fuel conduit 204 (and the fuel channeled therethrough). In alternative embodiments, $D_2$ is equal to or less than $D_1$. One or both of fuel conduits 202 and/or 204 may be fabricated from a suitable conduit material, such as aluminum, steel, titanium, synthetic rubbers, TEFLON®, alloys or combinations thereof, and/or any other suitable conduit material (TEFLON is a registered trademark of The Chemours Company FC, LLC, Wilmington, Del.). It should be understood that different materials are suitable for different temperature environments, applications, and other characteristics of fuel conduits 202, 204.

The temperature difference between fuel conduits 202, 204 may vary along a length of fuel conduits 202, 204. For example, fuel conduits 202, 204 draw fuel from the same source (e.g., a fuel tank) but at different rates. Accordingly, at a location near to the source, the temperature difference between fuel conduits 202, 204 may be relatively small. As the distance from the source grows, the temperature difference between fuel conduits 202, 204 increases, as the difference(s) in diameter and/or fuel flow rate contribute thereto. As the temperature difference increases, the efficiency of combustion of that fuel decreases. Accordingly, by the time fuel channeled through fuel conduits 202, 204 reaches the core engine, the temperature difference is at a relative maximum, and the efficiency of the core engine is decreased. Moreover, the temperature of fuel conduits 202, 204 may be increased by convection and/or radiation from adjacent, relatively hot (in comparison to fuel conduits 202, 204) engine components (e.g., the core engine, a compressor discharge nozzle, a high pressure turbine, etc.).

As described in detail herein, a thermal coupling assembly 210 coupled to first and second fuel conduits 202, 204 facilitates decreasing the temperature difference between first and second fuel conduits 202, 204 along a length thereof by thermally coupling first and second fuel conduits 202, 204 to each other. In other words, one of fuel conduits 202, 204 is configured as a heat source and the other of fuel conduits 202, 204 is configured as a heat sink. In addition, thermal coupling assembly 210 facilitates shielding of fuel conduits 202, 204 from heat transfer from other engine components. In the illustrated embodiment, thermal coupling assembly 210 includes a thermally conductive element 212, an insulative member 214 (also referred to herein as an "insulative wrap"), and a cover 216. In a broad sense, thermally conductive element 212 is configured to transfer heat between a relatively hot first fuel conduit 202 to a relatively cool second fuel conduit 204; insulative wrap 214 is configured to decrease heat transfer to and from additional engine components; and cover 216 is configured to maintain the configuration of thermal coupling assembly 210 and fuel conduits 202, 204, as well as reduce radiation from an engine environment surrounding thermal coupling assembly 210.

In one embodiment, thermally conductive element 212 includes a metal foam, such as an aluminum, copper, or steel foam, or an alloy foam, such as a graphite foam (e.g., POCOFoam® (POCOFoam is a registered trademark of POCO Graphic, Inc., Decatur, Tex.)). Metal or alloy foams are not only highly thermally conductive but are relatively lightweight or low density, such that thermally conductive element 212 does not add a substantial amount of weight to engine 100. Additionally, these foam materials exhibit relatively high stiffness and high strength for their weight, which improves damping and controlling vibrations of and through fuel conduits 202, 204. Accordingly, thermally conductive element 212 not only provides a thermal benefit to fuel management system 200 but provides a mechanical benefit as well, reducing or eliminating the need for brackets or clamps to control vibration of fuel conduits 202, 204. Thus, in some cases, weight and/or cost associated with those brackets or clamps may be reduced. Thermally conductive element 212 may include additional or other suitable materials, although in the illustrated embodiment, thermally conductive element 212 has a relatively high thermal conductivity and a relatively low density. In particular, thermally conductive element 212 may include any suitable material with a thermal conductivity between a thermal conductivity of the material of fuel conduits 202 and/or 204 to about 1950 W/m·K (or about 13520 BTU·in/(hr·ft²·F); about five times the thermal conductivity of copper), such that thermally conductive element 212 is configured to transfer heat between fuel conduits 202, 204. It should be understood that thermal conductivity (also known as Lambda) refers to the rate at which heat passes through a material, measured in watts per square meter of surface area for a temperature gradient of one kelvin for every meter thickness, or W/mK. Moreover, in the example embodiment, thermally conductive element 212 has a width that is greater than half of diameter $D_1$. Thermally conductive element 212 may have an alternative width, such as less than or equal to half of diameter $D_1$, or less than, equal or, or greater than half of diameter $D_2$.

In one embodiment, thermally conductive element 212 includes a core (not shown) including a phase change material. The core is configured to change phase at temperatures near to the working temperatures of fuel management system 200. Such a phase change thereby draws energy from thermal coupling assembly 210 (e.g., from thermally conductive element 212, first fuel conduit 202, and/or second fuel conduit 204). Additionally or alternatively, the core is configured to store thermal energy during the phase change.

In one embodiment, insulative wrap 214 includes an insulative material having a relatively low thermal conductivity, such that heat transfer away from a sub-assembly 218 of fuel conduits 202, 204 and thermally conductive element 212 is minimized. Moreover, insulative wrap 214 reduces heat transfer into sub-assembly 218, particularly fuel conduits 202, 204, from other engine components (e.g., core system 104). Insulative wrap 214 also serves to maintain the relative positions of fuel conduits 202, 204 and thermally conductive element 212, preventing relative movement thereof. Insulative wrap 214 may include suitably insulative materials, such as a woven silica, basalt, fiberglass, ceramics, silicone, rubber, resins, KEVLAR®, SUPERWOOL®, etc. (KEVLAR is a registered trademark of E.I. du Pont de Nemours and Company, Wilmington, Del.; SUPERWOOL is a registered trademark of Morgan Advanced Materials PLC, Berkshire, UK) Moreover, insulative wrap 214 may be pre-formed (e.g., as a sleeve) prior to application or may be formed during application (e.g., as a sprayed-on or coated-on material). In one embodiment, insulative wrap 214 may include any suitable material with a thermal conductivity of about 0.02 W/m·K (or about 0.2 BTU·in/(hr·ft$^2$·F)) to less than about 10 W/m·K (or about 70 BTU BTU·in/(hr·ft$^2$·F)), such that insulative wrap 214 is configured to reduce heat transfer to and from sub-assembly 218 of fuel conduits 202, 204 and thermally conductive element 212. In some embodiments, the thermal conductivity of insulative warp 214 changes with temperature of the thermal environment therearound.

Cover 216 is configured to surround and retain at least a portion of fuel conduits 202, 204, thermally conductive element 212, and insulative wrap 214 therein and prevent relative movement thereof, which improves reduction of vibrations of fuel conduits 202, 204, as described above. In addition, cover 216 is configured to reduce radiation from the thermal environment surrounding thermal coupling assembly 210. In particular, cover 216 has a highly reflective surface 220 exhibiting low surface emissivity. In one embodiment, cover 216 is a polished sheet metal, such as steel, aluminum, other sheet metals, and/or alloys or combinations thereof. In the example embodiment, cover 216 has a thickness of about 0.003 inches. In other embodiments, cover 216 has a greater thickness or smaller thickness than 0.003 inches. Additionally, in one embodiment, cover 216 has a surface emissivity between about 0.1 to about 0.45.

In one embodiment, thermal coupling assembly 210 may be coupled to fuel conduits 202, 204 anywhere along the length(s) thereof, where fuel conduits 202, 204 extend in parallel to each other for a predetermined distance (e.g., for the length of thermal coupling assembly 210). In other embodiments, thermal coupling assembly 210 is configured to thermally couple two non-parallel elongate members, for example, by providing thermally conductive element 212, insulative wrap 214, and cover 216 with suitable angle(s) and/or curve(s) to thermally couple the non-parallel elongate members. Moreover, a plurality of thermal coupling assemblies 210 may be coupled to fuel conduits 202, 204 to enhance the thermal and mechanical benefits of thermal coupling assembly 210 on fuel management system 200 locally and across system 200. Alternatively, a single thermal coupling assembly 210 may be configured to extend along a portion of or substantially along an entire length of fuel management system 200.

In the illustrated embodiment, thermally conductive element 212 includes a first end wall 222, a second end wall 224, a first side wall 226, a second side wall 228, and a body 230 extending between first end wall 222 and second end wall 224 and between first side wall 226 and second side wall 228. First end wall 222 is configured to engage an outer surface 232 of first fuel conduit 202, and second end wall 224 is configured to engage an outer surface 234 of second fuel conduit 204. Thermally conductive element 212 may be pre-formed prior to assembly of thermal coupling assembly 210, such that first end wall 222 is pre-formed to be complementary to outer surface 232 and second end wall 224 is pre-formed to be complementary to outer surface 234. Alternatively, thermally conductive element 212 is formed during assembly of thermal coupling assembly (e.g., is sprayed or molded), such that end walls 222, 224 automatically take a shape complementary to outer surfaces 232 and 234, respectively.

Insulative member 214 includes a first side wall 236 and a second side wall 238, as well as a first end portion 240 and a second end portion 242. In one embodiment, first side wall 236, first end portion 240, second side wall 238, and second end portion 242 are connected continuously in series, such that insulative member 214 is a single, continuous component. Alternatively, one or more seams, hinges, seals and/or welds (collectively "joining component") may be formed in insulative member 214, such that insulative member 214 includes two or more discrete pieces coupled together.

Similarly, cover 216 includes a first side wall 244, a second side wall 246, a first end portion 248 and a second end portion 250. In the illustrated embodiment of FIG. 4, a joining component 252 is defined in cover 216. Joining component 252 is illustrated as a mortise and tenon-type joining component 252; however, it should be understood that joining component 252 may include any other element, such as seams, hinges, welds, and/or seals. Cover 216 includes joining component 252 to simplify installation of thermal coupling assembly 210 on fuel conduits 202, 204. In the example embodiment, thermal coupling assembly 210 is installed in or coupled to fuel management system 200 "in the field," or, in other words, is a portable and/or re-usable assembly 210. Installation is relatively simple, in that an installer need only position thermally conductive element 212 between fuel conduits 202 and 204, wrap (or otherwise install) insulative member 214 around sub-assembly 218, and attach cover 216 therearound.

In the illustrated embodiment, first and second side walls 244 and 246 of cover 216 include a concave cross-section. This concavity, as well as a minimized surface area of outer surface 220, improves the reduction of thermal radiation transfer through outer surface 220 of cover 216. First and second side walls 236 and 238 of insulative member 214 also include a concave cross-section with a concavity approximately congruent to the concavity of cover 216. In addition, first and second side walls 226 and 228 of thermally conductive member 212 include a concave cross-section with a concavity approximately congruent to the concavity of insulative member 214 (and, therefore, approximately congruent to the concavity of cover 216).

The above-described thermal coupling assemblies provide an efficient method for heat transfer between a heat source and a heat sink. Specifically, the above-described thermal coupling assembly includes a thermally conductive element configured to provide heat transfer between a relatively hot outer surface of a first fuel conduit and a relatively cool outer surface of a second fuel conduit. Such heat transfer reduces a temperature difference between the fuel conduits, which not only improves engine performance but extends service intervals for the fuel conduits and fuel nozzle. The thermal coupling assembly also includes an insulative wrap, which reduces or eliminates the need for thicker and/or heavier insulation material, such that weight and/or cost of insulating the fuel conduits may be decreased. Moreover, the insulative wrap and a cover wrapped therearound reduce vibration of the fuel conduits, reducing or eliminating the need for extra brackets or clamps. Accordingly, additional weight and/or cost savings may be effected, on top of the mechanical benefit provided by the thermal coupling assembly. The above-described thermal coupling assembly is configured to be portable and simple to install on a fuel manifold of an engine, and is applicable to a variety of engine systems.

Exemplary embodiments of thermal coupling assemblies are described above in detail. The thermal coupling assemblies, and methods of operating such assemblies and component devices are not limited to the specific embodiments described herein, but rather, components of the systems and/or steps of the methods may be utilized independently and separately from other components and/or steps described herein. For example, embodiments of the thermal coupling assembly may be used to facilitate heat transfer between any two elongate members, including piping, conduits, and/or any other elongate structures (e.g., aircraft oil systems). Accordingly, although the thermal coupling assembly is described with respect to an aircraft engine, embodiments of the thermal coupling assembly can be implemented and utilized in connection with many other applications and systems that have elongate components thereof that may be thermally coupled to each other.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A thermal coupling assembly comprising:
    a fuel management system that includes a thermally conductive element comprising:
        a concave first end wall that engages a surface of a heat source, the heat source having a first diameter;
        a concave second end wall that engages a surface of a heat sink, the heat sink having a second diameter different than the first diameter;
        spaced-apart concave first and second sidewalls, the concave first and second sidewalls extending between the concave first end wall and the concave second end wall; and
        a body comprising a thermal conductor, the body being disposed between the concave first end wall and the concave second end wall and bound by the concave first end wall, the concave second end wall, the concave first sidewall, and the concave second sidewall to form the body as having an hourglass shape, wherein the thermal conductor includes a core that changes phase at a working temperature of the fuel management system during operation of the fuel management system;
    an insulative wrap at least partially surrounding the thermally conductive element, the heat source, and the heat sink; and
    a cover at least partially surrounding at least one of the insulative wrap, the thermally conductive element, the heat source, and the heat sink.

2. The assembly of claim 1, wherein the heat source and the heat sink comprise elongate members, which extend in parallel for a predetermined distance.

3. The assembly of claim 1, wherein the cover comprises a pair of opposing side walls having a concave cross section.

4. The assembly of claim 1, wherein the concave first end wall comprises a surface complementary to the surface of the heat source, and the concave second end wall comprises a surface complementary to the surface of the heat sink.

5. The assembly of claim 1, wherein at least one of the heat source and the heat sink comprises a piping member.

6. The assembly of claim 1, wherein the cover comprises a polished metal insulative cover having an emissivity between 0.1 and 0.45.

7. A method of thermally coupling a heat source and a heat sink, the method comprising:
    coupling a thermally conductive element that is part of a fuel management system to the heat source and the heat sink, the thermally conductive element including a concave first end wall that engages a surface of the heat source, a concave second end wall that engages a surface of the heat sink, spaced-apart concave first and second sidewalls extending between the concave first end wall and the concave second end wall, and a body including a thermal conductor that includes a core that is configured to change phase at a working temperature of the fuel management system during operation of the fuel management system, the body being bound by the concave first end wall, the concave second end wall, the concave first sidewall, and the concave second sidewall to form the body as having an hourglass shape;
    wrapping an insulative member around the thermally conductive element, the heat source, and the heat sink; and
    encasing the insulative member, the thermally conductive element, the heat source, and the heat sink in a cover.

8. The method of claim 7, wherein coupling the thermally conductive element to the heat source and the heat sink comprises coupling the thermally conductive element to the heat source and the heat sink comprising elongate members that extend in parallel for a predetermined distance.

9. The method of claim 8, wherein coupling the thermally conductive element to the heat source and the heat sink comprises coupling the thermally conductive element to the heat source and the heat sink comprising piping members.

10. The method of claim 7, further comprising providing the thermally conductive element including the concave first end wall having a surface complementary to the surface of the heat source and the concave second end wall having a surface complementary to the surface of the heat sink.

11. The method of claim 7, further comprising:
    providing the thermally conductive element including the body; and providing the cover having a pair of opposing side walls having a concave cross-section.

12. A turbofan engine comprising:
a core engine;
a fuel management system configured to provide fuel to the core engine; and
a thermal coupling assembly coupled to the fuel management system, the thermal coupling assembly comprising:
   a thermally conductive element comprising:
      a concave first end wall that engages a surface of a heat source of the fuel management system, the heat source having a first diameter;
      a concave second end wall that engages a surface of a heat sink of the the said management system, the heat sink having a second diameter different than the first diameter;
      spaced-apart concave first and second sidewalls, the concave first and second sidewalls extending between the concave first end wall and the concave second end wall; and
      a body comprising a thermal conductor, the body being disposed between the concave first end wall and the concave second end wall and bound by the concave first end wall, concave second end wall, concave first sidewall, and concave second sidewall to form the body as having an hourglass shape, wherein the thermal conductor includes a core that is configured to change phase at a working temperature of the fuel management system during operation of the fuel management system;
   an insulative wrap at least partially surrounding the thermally conductive element, the heat source, and the heat sink; and
   a cover at least partially surrounding at least one of the insulative wrap, the thermally conductive element, the heat source, and the heat sink.

13. The turbofan engine of claim 12, wherein the heat source and the heat sink comprise elongate members, which extend in parallel for a predetermined distance.

14. The turbofan engine of claim 13, wherein the heat source and the heat sink comprise piping members of said fuel management system.

15. The turbofan engine of claim 12, wherein the cover comprises a pair of opposing side walls having a concave cross section.

16. The turbofan engine of claim 12, wherein the concave first end wall comprises a surface complementary to the surface of the heat source, and the concave second end wall comprises a surface complementary to the surface of the heat sink.

* * * * *